United States Patent
Xu et al.

(10) Patent No.: US 12,527,508 B2
(45) Date of Patent: Jan. 20, 2026

(54) ELASTIC ELECTROENCEPHALOGRAPHY DRY ELECTRODE, ELECTROENCEPHALOGRAPHY DEVICE AND APPLICATION SYSTEM

(71) Applicant: Tianjin University, Tianjin (CN)

(72) Inventors: Minpeng Xu, Tianjin (CN); Rumeng Ding, Tianjin (CN); Hui Li, Tianjin (CN); Dong Ming, Tianjin (CN)

(73) Assignee: Tianjin University, Tianjin (CN)

( * ) Notice: Subject to any disclaimer, the term of this patent is extended or adjusted under 35 U.S.C. 154(b) by 80 days.

(21) Appl. No.: 18/551,109

(22) PCT Filed: May 11, 2022

(86) PCT No.: PCT/CN2022/092316
§ 371 (c)(1),
(2) Date: Sep. 18, 2023

(87) PCT Pub. No.: WO2023/115788
PCT Pub. Date: Jun. 29, 2023

(65) Prior Publication Data
US 2024/0164684 A1    May 23, 2024

(30) Foreign Application Priority Data
Dec. 23, 2021   (CN) .......................... 202111585706.5

(51) Int. Cl.
*A61B 5/291* (2021.01)
*A61B 5/251* (2021.01)
(Continued)

(52) U.S. Cl.
CPC .............. *A61B 5/291* (2021.01); *A61B 5/251* (2021.01); *A61B 5/265* (2021.01); *A61B 5/268* (2021.01);
(Continued)

(58) Field of Classification Search
CPC ......... A61B 5/291; A61B 5/384; A61B 5/268; A61B 5/251; A61B 5/265; A61B 5/378
See application file for complete search history.

(56) References Cited

FOREIGN PATENT DOCUMENTS

| CN | 108135524 A | 6/2018 |
|---|---|---|
| CN | 212066710 U | 12/2020 |

(Continued)

OTHER PUBLICATIONS

Li et al., "A dry electroencephalogram electrode for applications in steady-state visual evoked potential-based brain-computer interface systems," Biosensors and Bioelectronics, 187, pp. 1-7, 2021. (Year: 2021).*

(Continued)

*Primary Examiner* — Eric F Winakur
(74) *Attorney, Agent, or Firm* — Maginot, Moore & Beck (57) ABSTRACT

Disclosed is an elastic electroencephalography dry electrode, comprising an electrode base and a plurality of dry electrode units, which are fixedly arranged on the electrode base, wherein each dry electrode unit comprises an elastic supporting element and at least one electrode probe element; one end of the elastic supporting element is fixed to the electrode base, and the other end thereof is connected to the electrode probe element; the electrode probe element is used for being in contact with a scalp to collect an electroencephalography signal; the elastic supporting element is used for transmitting the electroencephalography signal; and the electrode base comprises an electrode substrate element, an electrode unit fixing element and an electrode displacement limiting element. Further disclosed are an electroencephalography device and an application system.

17 Claims, 7 Drawing Sheets

(51) Int. Cl.
*A61B 5/265* (2021.01)
*A61B 5/268* (2021.01)
*A61B 5/378* (2021.01)
*A61B 5/384* (2021.01)

(52) U.S. Cl.
CPC .............. *A61B 5/378* (2021.01); *A61B 5/384* (2021.01); *A61B 2560/0468* (2013.01); *A61B 2562/0215* (2017.08); *A61B 2562/046* (2013.01); *A61B 2562/166* (2013.01)

(56) References Cited

FOREIGN PATENT DOCUMENTS

| | | | | |
|---|---|---|---|---|
| CN | 112656418 A | | 4/2021 | |
| CN | 113974637 A | | 1/2022 | |
| JP | 2013111361 A | * | 6/2013 | ............. A61B 5/291 |
| JP | 2021-94157 A | | 6/2021 | |
| WO | 2019/181389 A1 | | 9/2019 | |
| WO | 2020/157043 A1 | | 8/2020 | |

OTHER PUBLICATIONS

International Search Report corresponding to PCT Application No. PCT/CN2022/092316, mailed Sep. 8, 2022 (Chinese and English language document) (6 pages).

* cited by examiner

ELASTIC ELECTROENCEPHALOGRAPHY DRY ELECTRODE, ELECTROENCEPHALOGRAPHY DEVICE AND APPLICATION SYSTEM

CROSS-REFERENCE TO RELATED APPLICATIONS

This application is a U.S. national phase application of International Application No. PCT/CN2022/092316, filed on May 11, 2022, which claims priority to the Chinese Patent Application No. 202111585706.5, filed on Dec. 23, 2021. The entire disclosures of the above-identified applications are incorporated herein by reference.

FIELD

The present disclosure relates to the field of an electroencephalographic signal sensing technology, and in particular to an elastic electroencephalographic dry electrode, an electroencephalographic device and an application system.

BACKGROUND

A Brain-Computer Interface (BCI) system, that directly converts an activity of a central nervous system into an artificial output, is capable of substituting, repairing, enhancing, supplementing or improving a normal output of the central nervous system, thereby improving an interaction between the central nervous system and an internal or external environment.

At present, the BCI system based on electroencephalography (EEG) has been investigating extensively. EEG recording activities in brain by an electrophysiological signal as an indicator, is an overall representation for an electrophysiological activity of a brain neuron in a cerebral cortex, truly reflecting a command and motivation inside brain. The EEG has been widely applied in diagnosis of brain disorders and in the BCI system for its advantage such as ultra-high time resolution, non-invasiveness, and low cost.

An electroencephalographic electrode is a sensor for collecting and transmitting a bioelectrical signal from a human brain. As a core component of an electroencephalographic signal collecting unit, the electroencephalographic electrode directly decides quality of the electroencephalographic signal monitored and the user experience for a subject under test. Currently, the electroencephalographic electrode for collecting the electroencephalographic signal in the non-invasive BCI system mainly includes three types: a wet electrode, a semi-dry electrode, and a dry electrode. The wet electrode is applied in an extensive range, however with disadvantages of cumbersome preparation, high time consumption, and poor user experience due to indispensable application of a conductive gel for optimizing impedance and follow-up cleaning. Driven by pressure, the semi-dry electrode generally releases an electrolyte in an uncontrollable way, resulting in an unstable signal recorded. Additionally, the wet electrode and the semi-dry electrode both are not suitable to monitor the electroencephalographic signal for a long time period, because the conductive gel will dry out in the wet electrode and the electrolyte will deplete in the semi-dry electrode over time, thus hampering investigation on transformation of the BCI system from laboratory to real-life application scenario. The dry electrode has attracted extensive attention from researchers due to its advantage such as independence of a conductive medium, and ready-to-use. However, the existing dry electrode does not meet requirements to application and promotion for a dry electrode-based portable EEG device because of high contact impedance and poor user experience.

SUMMARY

The present disclosure aims to provide an elastic electroencephalographic dry electrode, an electroencephalographic device and an application system.

In view of the above, in a first aspect, the present disclosure provides in embodiments an elastic electroencephalographic dry electrode, including an electrode base and a plurality of dry electrode units fixedly arranged at the electrode base,
- wherein each dry electrode unit includes an elastic support component and at least one electrode probe component, with one end of the elastic support component fixed to the electrode base and the other end of the elastic support component connected to the electrode probe component;
- the electrode probe component collects an electroencephalographic signal by contacting with a scalp;
- the electrode probe component is of a curved surface fitting to contact with the scalp;
- the elastic support component transmits the electroencephalographic signal;
- the electrode base includes an electrode substrate component, an electrode unit fixation component and an electrode unit shift limitation component,
- wherein the electrode unit fixation component itself has an inclining angle and is fixedly arranged at the electrode substrate component, for fixing the dry electrode units to incline and spread outward;
- the electrode unit shift limitation component is fixedly arranged at an upper end of the electrode unit fixation component, for limiting a maximum shift of the dry electrode unit on the scalp; and
- the electrode substrate component fixes and connects the dry electrode unit and transmits the electroencephalographic signal collected to a data processing module.

According to embodiments of the present disclosure, the electroencephalographic dry electrode guarantees collection of the electroencephalographic signal with high quality when monitoring for a long time period due to independence of applying a conductive medium, and also contributes to convenient use. The dry electrode unit includes at least one electrode probe component, when equipped onto the elastic support component of the dry electrode unit, not only guaranteeing comfortability, but also increasing a density of the electroencephalographic signal collected, thus improving performance of individual dry electrode units on signal collection. The electrode probe component is of a curved surface fitting to contact with the scalp, thus contributing to reduced discomfortability in use and improved comfortability that user experiences. The electrode unit fixation component fixes the dry electrode unit to incline at an angle, allowing the dry electrode units to spread outward into a comb shape, thus making them separate hairs easier to establish good contact with the scalp and collect a stable electroencephalographic signal. The electrode unit shift limitation component is fixedly arranged at an upper end of the electrode unit fixation component, such that when the dry electrode units are subject to a certain pressure, the electrode unit shift limitation component not only limits the maximum shift of the dry electrode unit, ensuring a relatively concentrated range where the electroencephalographic signal is collected by the dry electrode unit, but also shares excess pressure, reducing a sense of pressure caused by the dry electrode unit and improving user-friendliness.

In some embodiments, the elastic support component includes an elastic conductive filament characterized by a large elastic limit.

In some embodiments, the elastic conductive filament is made of a nickel-titanium alloy.

The elastic conductive filament made of the nickel-titanium alloy, serving as both an elastic support and a conductive media and exhibiting a superelastic characteristic at room temperature, when used in a moderate length and with high elasticity, promotes the electrode probe component to fit the scalp surface, slide into a hair area, separate hairs, and establish good contact with the scalp, thus improving performance on signal collection. Besides, the elastic conductive filaments made of the nickel-titanium alloy with a moderate elasticity, when subject to a certain pressure, bend naturally to spread outward into the comb shape, fitting the scalp surface, rather than forming a rigid confronting contact between the electroencephalographic dry electrode and the scalp, avoiding pain and ensuring comfortability. In addition, the elastic conductive filament made of the nickel-titanium alloy with good elasticity allows the electroencephalographic dry electrode to quickly reset to its original shape after use for reuse later, thus saving resources and reducing costs. Further, the elastic conductive filament made of the nickel-titanium alloy with a high damping characteristic prevents the electrode probe component from being interfered by subtle movement, thus establishing a more stable contact between the scalp and the electrode probe component.

In some embodiments, the elastic support component is of a length of 3 to 30 mm and a diameter of 0.5 to 5 mm.

The elastic support component between the electrode substrate component and the electrode probe component is of the diameter of 0.5 to 5 mm, ensuring a moderate elastic factor for the elastic support component of the dry electrode unit, relieving the pressure on the scalp caused by the dry electrode unit and improving comfortability in use.

In some embodiments, the elastic support component further includes: a conductive coating plated on a surface of the elastic conductive filament; or an additional conductive filament arranged parallel to or embedded in the elastic conductive filament.

In some embodiments, the conductive coating is made of copper or silver; and the additional conductive filament is a silver filament, a copper filament, an aluminium filament, a nickel filament, a titanium filament or a nickel-plated carbon steel filament.

The corporation of the elastic conductive filament with the conductive coating or the additional conductive filament improves the quality of the electroencephalographic signal collected and reduces transmission loss of the bioelectric signal.

In some embodiments, the electrode substrate component and the electrode probe component each are made of a conductive material.

The electrode substrate component and the electrode probe component each are made of a metal or polymer material with good conductivity, such as conductive silicone or conductive rubber.

In some embodiments, the electrode probe component is made of a material with low impedance, wherein the material with low impedance is a copper ball of purple copper, a copper ball of brass, a nickel-titanium alloy, conductive silicone or conductive rubber, thus preventing the electroencephalographic dry electrode from influencing the bioelectric signal.

In some embodiments, the electrode probe component is coated with a biocompatible material layer on its surface, and the biocompatible material layer is made of silver/silver chloride or gold, thereby reducing electrode polarization voltage, and improving the quality of the electroencephalographic signal collected.

In some embodiments, the biocompatible material layer is further coated with a hydrogel layer on its surface.

Outside the biocompatible material layer, the electrode probe component is further coated with the hydrogel layer, thus further reducing contact impedance between the electrode probe component and skin, enhancing contact stability, improving the quality of the electroencephalographic signal collected by the dry electrode unit.

In some embodiments, the electrode probe component is of a cross-section in a circular or oval shape.

In some embodiments, the electrode probe component is of a cross-section having a maximum distance between two points ranging from 1 to 7.5 mm.

The electrode probe component is of the cross-section having the maximum distance between two points ranging from 1 to 7.5 mm, thus providing the electrode probe component with an appropriate size, which is larger than a hair pore such that the scalp will not be pierced which results in discomformatablity, and is small enough for convenient passing through hairs to contact with the scalp, thus ensuring that no hair is pressed under the electrode probe component.

In some embodiments, the plurality of dry electrode units are arranged at the electrode substrate component in a layout of unipolar arrangement, bipolar arrangement, or multipolar arrangement.

In some specific embodiments, based on a layout of the unipolar arrangement, the plurality of dry electrode units are arranged at the electrode substrate component in an array occupying a circular area, a square area, a triangle area or any other suitable shaped area, forming an ordinary dry electrode; while based on a layout of the bipolar arrangement or the multipolar arrangement, the plurality of dry electrode units are arranged at the electrode substrate component to form a Laplacian electrode, which enhances spatial resolution of the electroencephalographic signal collected, and increases a signal-to-noise ratio of the collected electroencephalographic signal by subtracting a common noise signal by means of differential recording. Following a principle of designing the Laplacian electrode, the plurality of dry electrode units may be arranged at the electrode substrate component in an array of a circular ring, a triangular ring or any other suitable shaped ring.

In some embodiments, the electrode substrate component is of a cross-section having a maximum distance between two points ranging from 5 to 50 mm.

The electrode substrate component is of the cross-section having the maximum distance between two points ranging from 5 to 50 mm, thus preventing the electrode substrate component from an overlarge area, thereby avoiding poor contact between the dry electrode unit and the scalp.

In some embodiments, the electrode substrate component is a Printed Circuit Board (PCB) or made of another conductive material, wherein the PCB may be single-layered or multi-layered; and the PCB may be in a circular, square or triangular shape.

In some embodiments, the electrode unit fixation component is formed by 3D-printing, inclined at an angle and provided with built-in slots for fixing the dry electrode units at position. The slots are positioned depending on where the dry electrode units are arranged at the electrode substrate component. The slot is of a diameter fitting that of the elastic support component.

In some embodiments, the electrode unit fixation component may be inclined at an angle of 15°, 20° or 25°, which may be varied depending on different positions where the dry electrode units are arranged at the electrode substrate component, thus allowing more dry electrode units to be arranged in an orderly manner, such that each electrode probe component is in contact with the scalp, thus increasing an overall contacting area.

In some embodiments, the electrode unit shift limitation component is both elastic and flexible, wherein one or more of the electrode unit shift limitation components are fixed uniformly and symmetrically at an upper end of the electrode unit fixation component.

The electrode unit shift limitation component is made of a material which is both elastic and flexible, such as elastic rubber and silicone, thus providing comfortability in use.

One or more of the electrode unit shift limitation components are fixed uniformly and symmetrically at an upper end of the electrode unit fixation component, thus ensuring a balanced force on the electrode unit shift limitation component. The electrode unit shift limitation component is in a shape of a cylinder, a rectangular cuboid or a cube. Without shielding and squeezing the dry electrode unit, the larger a cross-sectional area of the electrode unit shift limitation component is, the greater comfortability the electroencephalographic dry electrode provides. The electrode unit shift limitation component is of a height less than or equal to that of the shortest dry electrode unit arranged at the electrode base.

In a second aspect, the present disclosure provides in embodiments an electroencephalographic device, including:
an electroencephalographic dry electrode; and
a data processing module,
wherein the electroencephalographic dry electrode collects and transmits an electroencephalographic signal to the data processing module,
wherein the data processing module processes the electroencephalographic signal received and issues an operation command.

The data processing module plays a function to provide an operation such as pre-processing, feature extraction, and classification and identification on the electroencephalographic signal.

In a third aspect, the present disclosure provides in embodiments an application system, including:
an electroencephalographic device;
a display screen; and
a user,
wherein the display screen displays an operable interface for the user;
an electroencephalographic signal is generated in response to the user watching the operable interface;
the electroencephalographic signal is collected by an electroencephalographic dry electrode and transmitted to a data processing module; and
the data processing module processes the electroencephalographic signal received and issues an operation command.

According to embodiments of the present disclosure, the electroencephalographic dry electrode guarantees collection of the electroencephalographic signal with high quality when monitoring for a long time period due to independence of applying a conductive medium, and also contributes to convenient use. The elastic support component of the dry electrode unit, when being in contact with the scalp, bends naturally to spread outward into the comb shape, promoting the electrode probe component to fit the scalp, slide into a hair area, establish the good contact with the scalp, thus reducing contact impedance between the electrode probe component and the scalp, and improving the performance on signal collection. Additionally, the electrode probe component is of a curved surface fitting to contact with the scalp, thus contributing to reduced discomfortability in use and improved comfortability that user experiences. The present disclosure further provides in embodiments an electroencephalographic device.

BRIEF DESCRIPTION OF THE DRAWINGS

These and/or other aspects and advantages of embodiments of the present disclosure will become apparent and more readily appreciated from the following descriptions made with reference to the drawings, in which.

REFERENCES OF DRAWINGS electrode base 1, dry electrode unit 2, elastic support component 3, electrode probe component 4, electrode substrate component 5, electrode unit fixation component 6, electrode unit shift limitation component 7, electroencephalographic dry electrode 8.

DETAILED DESCRIPTION

Embodiments of the present disclosure are described in detail below, examples of which are illustrated in the drawings. The same or similar elements and the elements having same or similar functions are denoted by like reference numerals throughout the descriptions. The embodiments described herein with reference to drawings are explanatory and used to generally understand the present disclosure. The embodiments shall not be construed to limit the present disclosure.

An elastic electroencephalographic dry electrode, an electroencephalographic device and an application system provided in embodiments of the present disclosure are described below with reference to the drawings.

As shown in FIG. 1 to FIG. 18, the elastic electroencephalographic dry electrode 8 includes an electrode base 1 and a plurality of dry electrode units 2 fixedly arranged at the electrode base 1. The dry electrode unit 2 includes an elastic support component 3 and at least one electrode probe component 4, with one end of the elastic support component 3 fixed to the electrode base 1 and the other end of the elastic support component 3 connected to the electrode probe component 4. The electrode probe component 4 collects an electroencephalographic signal by contacting with a scalp. The electrode probe component 4 is of a curved surface fitting to contact with the scalp. The elastic support component 3 transmits the electroencephalographic signal. The electrode base 1 includes an electrode substrate component 5, an electrode unit fixation component 6 and an electrode unit shift limitation component 7. The electrode unit fixation component 6 itself has an inclining angle and is fixedly arranged at the electrode substrate component 5. The electrode unit shift limitation component 7 is fixedly arranged at an upper end of the electrode unit fixation component 6. The electrode substrate component 5 connects and fixes the dry electrode unit 2 and transmits the electroencephalographic signal collected to a data processing module. The electrode unit fixation component 6 fixes the dry electrode unit 2 to incline and spread outward. The electrode unit shift limitation component 7 limits a maximum shift of the dry electrode unit 2 on the scalp.

The electrode base 1 fixes the dry electrode unit 2 to incline at an angle and transmits the electroencephalographic signal collected to a data processing module.

Figure 1:
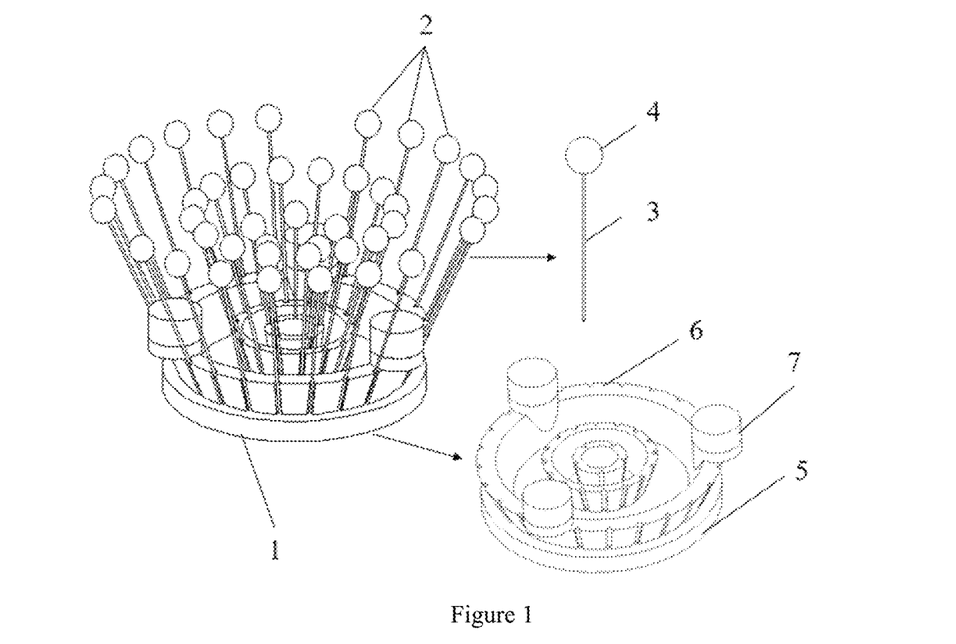
FIG. 1 is a schematic diagram showing an overall structure of an electroencephalographic dry electrode.
Figure 2:
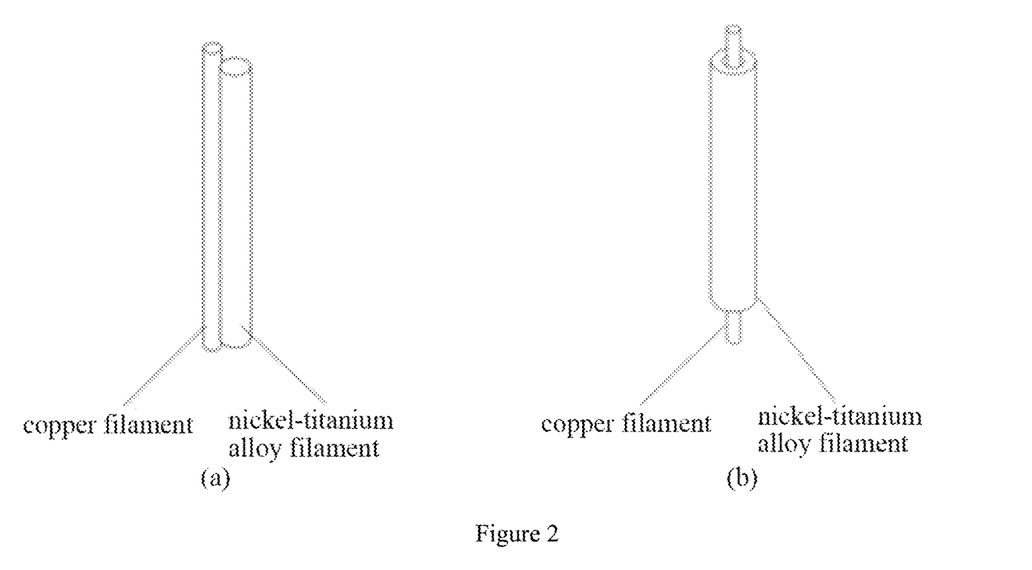
FIG. 2 is a schematic diagram showing an arrangement of relative positions of a copper filament and a nickel-titanium alloy filament.
Figure 3:
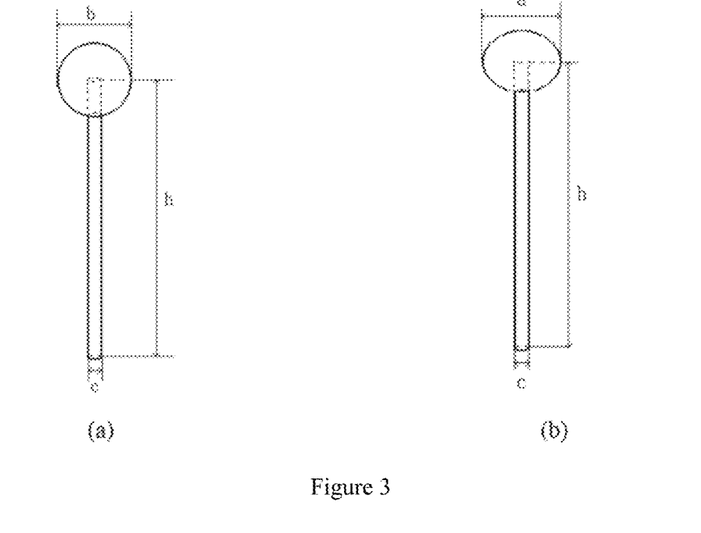
FIG. 3 is a schematic diagram showing dimensions of a dry electrode unit.

The electrode base 1 includes the electrode substrate component 5, the electrode unit fixation component 6 and the electrode unit shift limitation component 7. The electrode substrate component 5 is provided with a through-hole pad, and the electrode probe component 4 is provided with a hole at the surface. The elastic support component 3 is fixedly connected to the electrode substrate component 5 and the electrode probe component 4 respectively through the through-hole and the hole, by either soldering or conductive silver adhesive. The dry electrode unit 2 includes the elastic support component 3 and at least one electrode probe component 4, with one end of the elastic support component 3 connected to the electrode substrate component 5 and the other end of the elastic support component 3 connected to the electrode probe component 4. The elastic support component 3 provides both functions of support and electrical conductivity to transmit the electroencephalographic signal. In an embodiment of the present disclosure, the elastic support component 3 includes at least an elastic conductive filament. That is, the elastic conductive filament (such as a nickel-titanium alloy filament) may server as both a supporter and a conductive media. For improving quality of the electroencephalographic signal collected, in addition to the nickel-titanium alloy filament, the elastic support component 3 further includes an additional conductive filament made of a different material or a conductive coating plated on the nickel-titanium alloy filament. In an embodiment of the present disclosure, the additional conductive filament is a copper filament, and thus the elastic support component 3 includes the nickel-titanium alloy filament and the copper filament, where relative positions of the nickel-titanium alloy filament and the copper filament are arranged in two different ways. As shown in FIG. 2, the copper filament is arranged parallel to or embedded in the nickel-titanium alloy filament, where FIG. 2(a) is a schematic diagram showing the copper filament and the nickel-titanium alloy filament arranged in parallel, and FIG. 2(b) is a schematic diagram showing the copper filament embedded in the nickel-titanium alloy filament. Additionally, the nickel-titanium alloy filament is adhesive to the copper filament in an insulating way or in contact with the copper filament directly without adhesion. The performance of the electroencephalographic dry electrode 8 on signal collection and comfortability are partially decided by a length and a diameter of the elastic support component 3. In an embodiment where the electroencephalographic dry electrode 8 has been assembled, as shown in FIG. 3, the elastic support component 3 between the electrode substrate component 5 and the electrode probe component 4 is of a length h of 3 to 30 mm, and a diameter c of 0.5 to 5 mm. Two ends of the elastic support component 3 are fixedly connected to the electrode substrate component 5 and the electrode probe component 4, respectively via the through-hole pad arranged at the electrode substrate component 5 and the hole provided at the surface of the electrode probe component 4, by either soldering or conductive silver adhesive.

Figure 4:
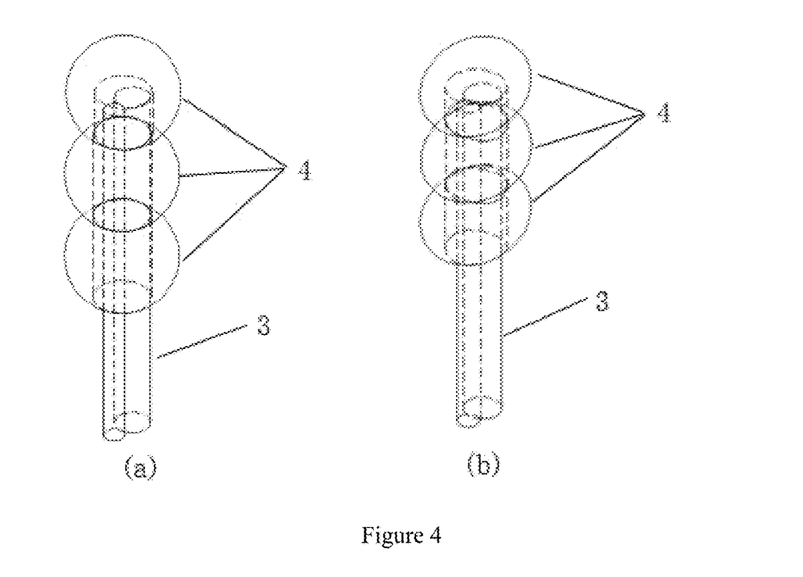
FIG. 4 is a schematic diagram showing a structure of an elastic support component provided with three electrode probe components.

The elastic support component 3 is provided with the electrode probe component 4. The electrode probe component 4 collects the electroencephalographic signal by contacting with the scalp. The electrode probe component 4 is of a curved surface fitting to contact with the scalp. The electrode probe component 4 is coated with silver/silver chloride or gold on its surface, thus reducing an influence of electrode polarization voltage. The electrode probe component 4 is made of a metal or polymer material with good conductivity such as copper, conductive silicone or conductive rubber. Outside the coating of silver/silver chloride or gold, the electrode probe component 4 may be further coated with a hydrogel layer, thus further reducing the contact impedance between the electrode probe component and the scalp, enhancing contact stability, and improving the quality of the electroencephalographic signal collected by the dry electrode unit. The electrode probe component 4 is provided with an appropriate size, which is larger than a hair pore such that the scalp will not be pierced which results in discomformatablity, and is small enough to aid the electrode probe component 4 to pass through the hairs to contact with the scalp, thus ensuring that no hair is pressed under the electrode probe component 4. The electrode probe component 4 is of a cross-section having a maximum distance between two points ranging from 1 to 7.5 mm. In an embodiment where the electrode probe components are of their cross-sections in respective circular and oval shapes, as shown in FIG. 3(*a*), the electrode probe component 4 is of a cross-section in a circular shape with a diameter b ranging from 1 to 7.5 mm; while as shown in FIG. 3(*b*), the electrode probe component 4 is of a cross-section in an oval shape with a long axis a ranging from 1 to 7.5 mm. The elastic support component 3 is provided with at least one electrode probe component 4. For increasing a density of the electroencephalographic signal collected, the elastic support component 3 is provided with a plurality of the electrode probe components 4. In an embodiment where the elastic support component 3 is provided with a plurality of the electrode probe components 4, the elastic support component 3 is provided with three electrode probe components 4 each having a cross-section in a circular or oval shape, as shown in FIG. 4, where FIG. 4(*a*) is a schematic diagram showing the elastic support component 3 provided with three electrode probe components 4 each having a cross-section in a circular shape; and FIG. 4(*b*) is a schematic diagram showing the elastic support component 3 provided with three electrode probe components 4 each having a cross-section in an oval shape.

Figure 5:
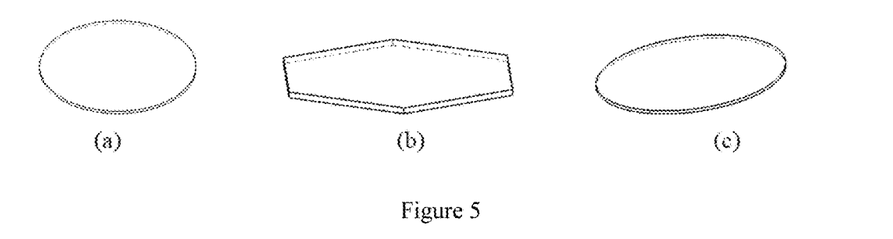
FIG. 5 is a schematic diagram showing a shape of an electrode substrate component.

The electrode substrate component 5 transmits the electroencephalographic signal collected to the data processing module. The electrode substrate component 5 is made of metal, conductive silicone or conductive rubber. The electrode substrate component 5 may be a double-layered or multi-layered Printed Circuit Board (PCB) provided with the through-hole pad. As shown in FIG. 5, the electrode substrate component 5 may be in a circular, oval or polygonal shape, where FIG. 5(*a*) is a schematic diagram showing an electrode substrate component 5 in a circular shape; FIG. 5(*b*) is a schematic diagram showing an electrode substrate component 5 in a polygonal shape; and FIG. 5(*c*) is a schematic diagram showing an electrode substrate component 5 in an oval shape. The electrode substrate component 5 is of a cross-section having a maximum distance between two points ranging from 5 to 50 mm, thus preventing the electrode substrate component 5 from an overlarge area, thereby avoiding poor contact between the dry electrode unit and the scalp.

Figure 6:
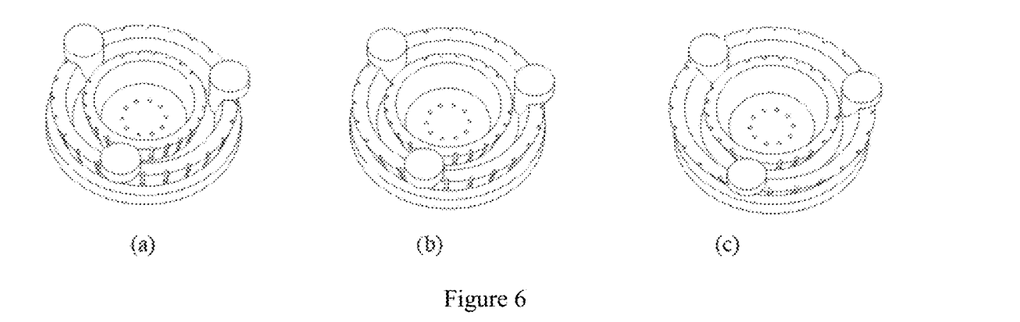
FIG. 6 is a schematic diagram showing electrode unit fixation components arranged to incline at different angles.
Figure 7:
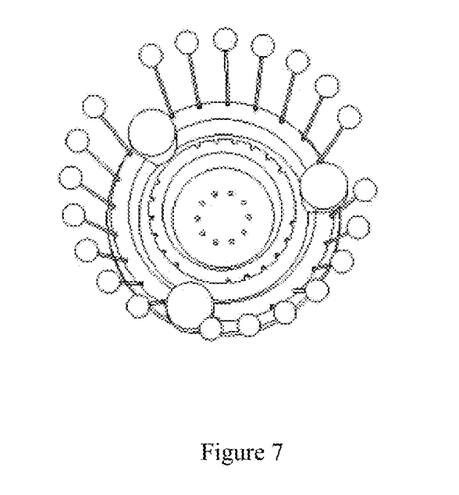
FIG. 7 is a schematic diagram showing the dry electrode unit fixed at the electrode unit fixation component.

The electrode unit fixation component 6 is provided with slots for fixing the elastic support components 3 to incline at an angle, allowing the elastic support components 3 to spread outward. The slot is positioned depending on where the through-hole pad is arranged at the electrode substrate component 5, and is of a diameter fitting that of the elastic support component 3, thereby achieving precise assembly and ensuring individual dry electrode units 2 to incline at respective predetermined angles with relative positions fixed. The electrode unit fixation component 6 may be arranged to incline at an angle such as 15°, 20°, 25°, or any other suitable angle. The electrode unit fixation component 6 may be in a shape such as a hollow cone, a hollow prism, or any other suitable shape, depending on in which shape the dry electrode units 2 are arranged at the electrode substrate component 5. In an embodiment where the electrode unit fixation component 6 is in a shape of the hollow cone and is arranged to incline at respective angles of 15°, 20°, and 25°, FIG. 6 is a schematic diagram showing the electrode unit fixation components 6 arranged to incline at different angles, where FIG. 6(*a*) is a schematic diagram showing that an electrode unit fixation component 6 is arranged to incline at an angle of 15°; FIG. 6(*b*) is a schematic diagram showing that an electrode unit fixation component 6 is arranged to incline at an angle of 20°; and FIG. 6(*c*) is a schematic diagram showing that an electrode unit fixation component 6 is arranged to incline at an angle of 25°. FIG. 7 is a schematic diagram showing that the dry electrode unit 2 is fixed at an electrode unit fixation component 6, where the electrode unit fixation component 6 is in a shape of a hollow cone and is arranged to incline at an angle of 20°.

The electrode unit shift limitation component 7 not only limits the maximum shift of the dry electrode unit 2, ensuring a relatively concentrated range where the electroencephalographic signal is collected by the dry electrode unit 2, but also shares excess pressure, reducing a sense of pressure caused by the dry electrode unit 2 and improving user-friendliness. The electrode unit shift limitation component 7 is made of a material which is both elastic and flexible, such as elastic rubber, or silicone, thus providing comfortability in use. The electrode unit shift limitation component 7 may be in a shape, such as a cylinder, a rectangular cuboid, and a cube. The electrode unit shift limitation component 7 is of a height less than or equal to that of the shortest dry electrode unit 2 arranged at the electrode base 1.

Each electroencephalographic dry electrode 8 is provided with one or more of the electrode unit shift limitation components 7. Without shielding and squeezing the dry electrode unit 2, the electrode unit shift limitation components 7 are fixed uniformly and symmetrically at an upper end of the electrode unit fixation component 6, where the larger a cross-sectional area of the electrode unit shift limitation component 7 is, the greater comfortability the electroencephalographic dry electrode 8 provides.

Figure 8:
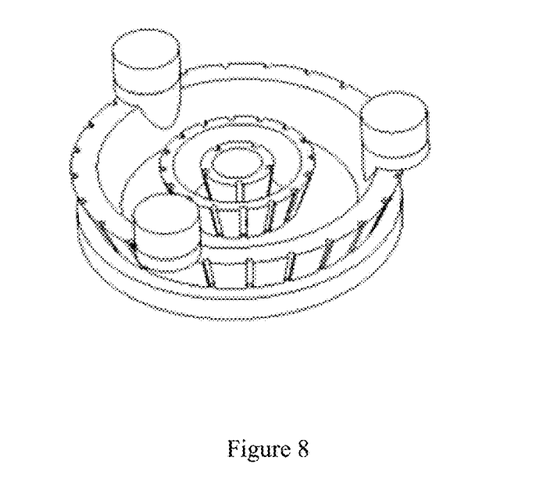
FIG. 8 is a schematic diagram showing relative positions of electrode unit shift limitation components and an electrode substrate component.

In an embodiment where three electrode unit shift limitation components 7 each in a cylinder shape are evenly distributed at one electroencephalographic dry electrode 8, FIG. 8 is a schematic diagram showing relative positions where the electrode unit shift limitation components 7 are fixed at an upper end of the electrode unit fixation component 6.

Figure 9:
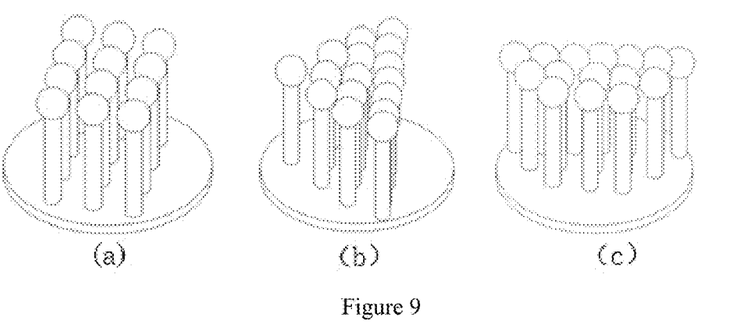
FIG. 9 is a schematic diagram showing a layout of a unipolar arrangement.
Figure 10:
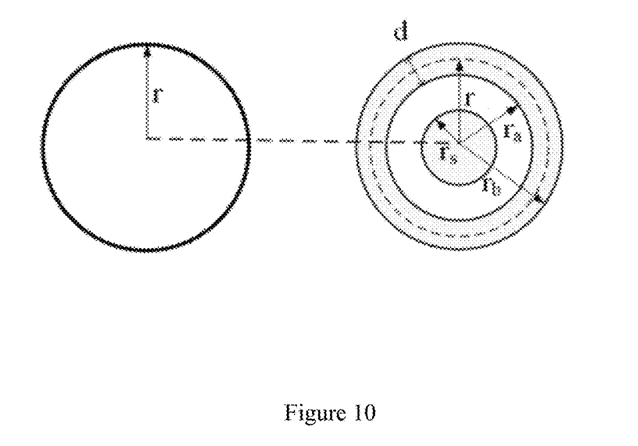
FIG. 10 is a schematic diagram showing a bipolar Laplacian electrode.
Figure 11:
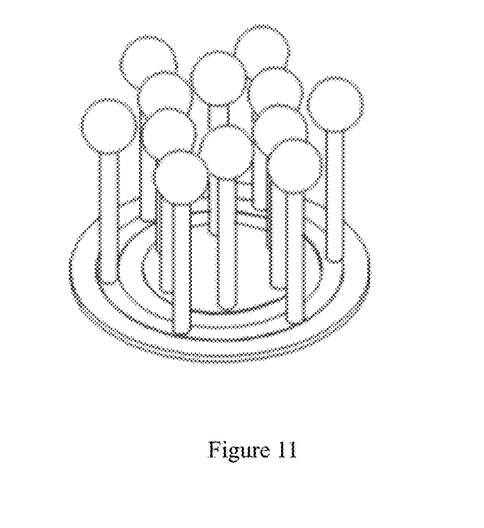
FIG. 11 is a schematic diagram showing a layout of bipolar arrangement in an array of a circular ring.

The electrode probe component 4 and the elastic support component 3 are combined together to form the dry electrode unit 2. The electrode base 1 may be provided with a plurality of dry electrode units 2, which are arranged at the electrode substrate component 5 in an array occupying a certain shaped area, forming the electroencephalographic dry electrode 8, suitable for collecting the electroencephalographic signal in the hair area of the scalp. The dry electrode units 2 are arranged at the electrode substrate component 5 in a layout of unipolar arrangement, bipolar arrangement, or multipolar arrangement. As shown in FIG. 9, in an embodiment where the dry electrode units 2 are arranged at the electrode substrate component 5 in a layout of the unipolar arrangement, the dry electrode units 2 may be arranged in an array occupying a trapezoid, square or triangle area, where FIG. 9(*a*) illustrates an array occupying a square area; FIG. 9(*b*) illustrates an array occupying a triangle area; and FIG. 9(*c*) illustrates an array occupying a trapezoid area. In an embodiment where the dry electrode units 2 are arranged at the electrode substrate component 5 in a layout of the bipolar arrangement or the multipolar arrangement, the dry electrode units 2 are arranged at the electrode substrate component 5 to form a Laplacian electrode. Following a principle of designing the Laplacian electrode, the dry electrode units 2 may be arranged at the electrode substrate component 5 in an array of a circular ring or a triangular ring. In an example of a bipolar Laplacian electrode, FIG. 10 shows the layout, where r is an effective radius of the circular ring; $r_b$ is an outer radius of the circular ring; $r_a$ is an inner radius of the circular ring; $r_s$ is a radius of the central electrode; d is a width of the circular ring; and the outer circular ring is apart from the central electrode by an insulator. FIG. 11 is a schematic diagram showing that the dry electrode units 2 are arranged in a layout of bipolar arrangement and in an array of a circular ring.

Figure 12:
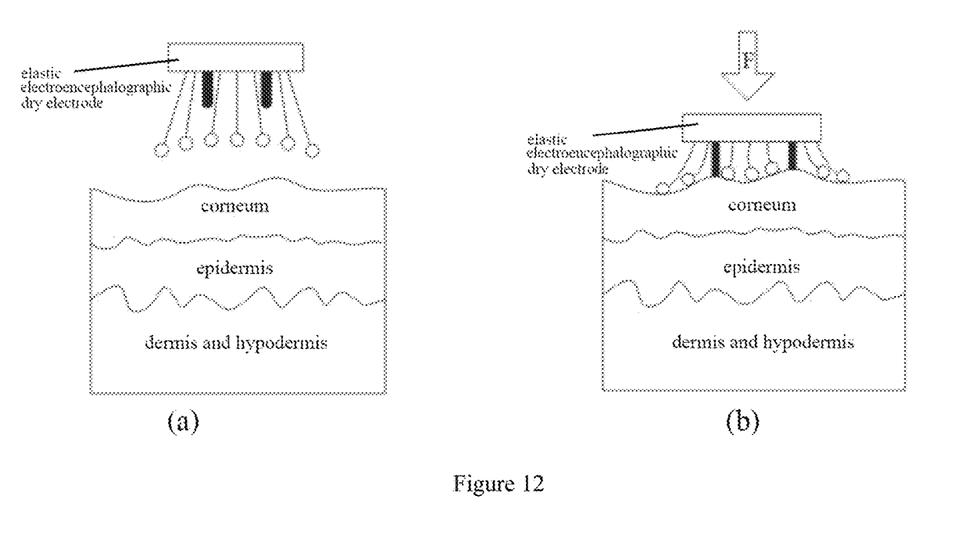
FIG. 12 is a schematic diagram showing an electroencephalographic dry electrode with dry electrode units each having a single electrode probe component and arranged in an array occupying a circular area before and in use.
Figure 13:
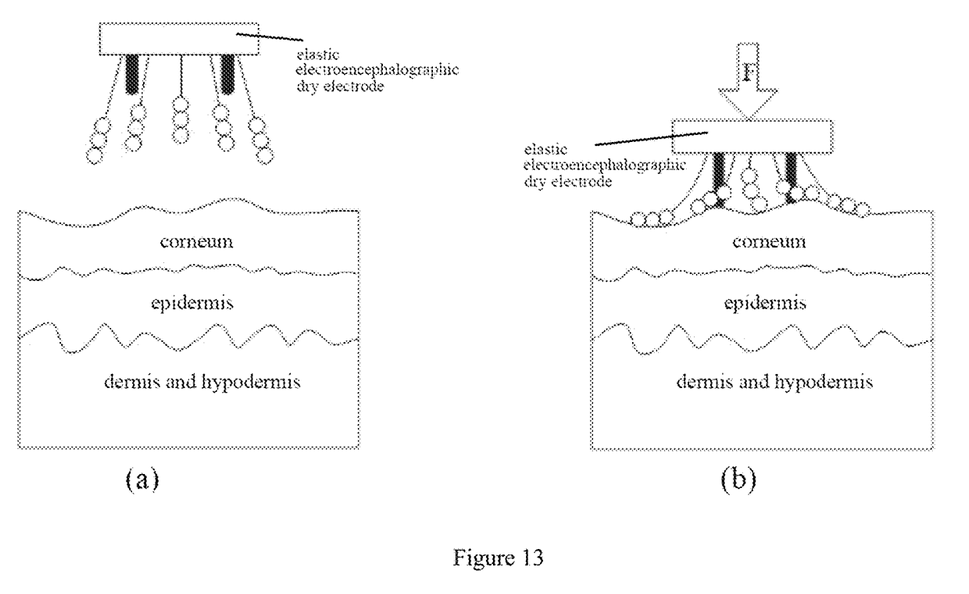
FIG. 13 is a schematic diagram showing an electroencephalographic dry electrode with dry electrode units each having three electrode probe components and arranged in an array occupying a circular area before and in use.
Figure 14:
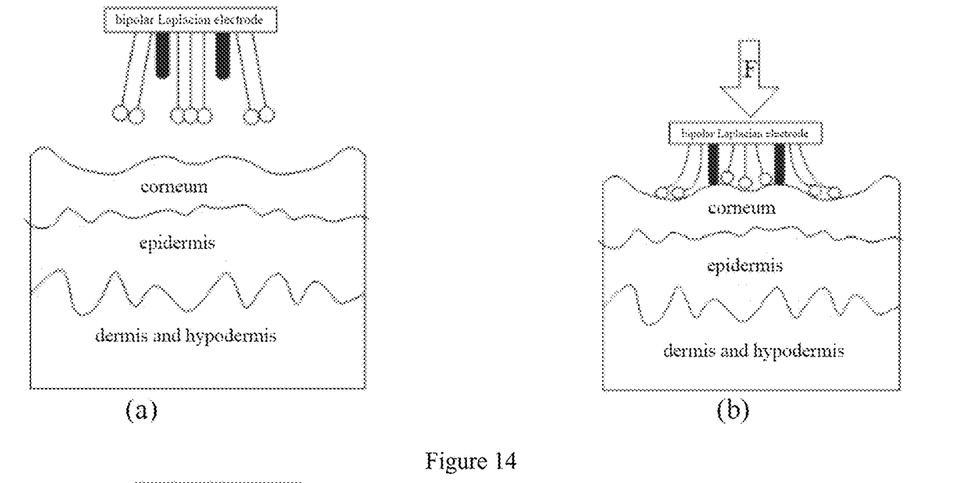
FIG. 14 is a schematic diagram showing an electroencephalographic dry electrode with dry electrode units each having a single electrode probe component and arranged in a layout of bipolar arrangement before and in use.
Figure 15:
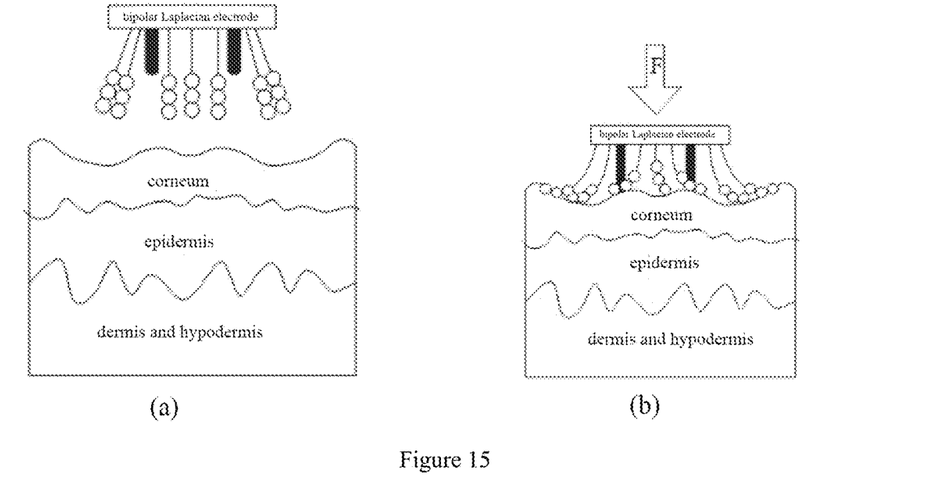
FIG. 15 is a schematic diagram showing an electroencephalographic dry electrode with dry electrode units each having three electrode probe components and arranged in a layout of bipolar arrangement before and in use.

In an embodiment where the electrode substrate component 5 is a double-layered PCB in a circular shape and the electrode probe component 4 is of a cross-section in a circular shape, FIG. 12 shows an electroencephalographic dry electrode 8 with the dry electrode units 2 each having a single electrode probe component 4 and arranged in an array occupying a circular area before and in use, where FIG. 12(a) illustrates the electroencephalographic dry electrode 8 before use; and FIG. 12(b) illustrates the electroencephalographic dry electrode 8 in use. FIG. 13 shows an electroencephalographic dry electrode 8 with the dry electrode units 2 each having three electrode probe components 4 and arranged in an array occupying a circular area before and in use, where FIG. 13(a) illustrates the electroencephalographic dry electrode 8 before use; and FIG. 13(b) illustrates the electroencephalographic dry electrode 8 in use. FIG. 14 shows an electroencephalographic dry electrode 8 with the dry electrode units 2 each having a single electrode probe component 4 and arranged in a layout of bipolar arrangement and in an array of a circular ring, forming the Laplacian electrode, before and in use, where FIG. 14(a) illustrates the electroencephalographic dry electrode 8 before use; and FIG. 14(b) illustrates the electroencephalographic dry electrode 8 in use. FIG. 15 shows an electroencephalographic dry electrode 8 with the dry electrode units 2 each having three electrode probe components 4 and arranged in a layout of bipolar arrangement and in an array of a circular ring, forming the Laplacian electrode, before and in use, where FIG. 15(a) illustrates the electroencephalographic dry electrode 8 before use; and FIG. 15(b) illustrates the electroencephalographic dry electrode 8 in use. As can be seen from FIGS. 12 to 15, when the electroencephalographic dry electrode 8 is in use, the elastic support components 3 bend naturally to allow the electrode probe components 4 to fit the scalp surface, establishing good contact with the scalp; and resulting in an increased contacting area between the electrode probe components 4 with the scalp based on the elastic support component 3 being provided with three electrode probe components 4.

In a second aspect, the present disclosure provides in embodiments an electroencephalographic device including the electroencephalographic dry electrode 8 and a data processing module, where the electroencephalographic dry electrode 8 collects and transmits an electroencephalographic signal to the data processing module; and the data processing module processes the electroencephalographic signal received and issues an operation command.

In a third aspect, the present disclosure provides in embodiments an application system including the electroencephalographic device; a display screen; and a user, where the display screen displays an operable interface for the user; an electroencephalographic signal is generated in response to the user watching the operable interface; the electroencephalographic signal is collected by the electroencephalographic dry electrode 8 and transmitted to the data processing module; and the data processing module processes the electroencephalographic signal received and issues an operation command.

Figure 16:
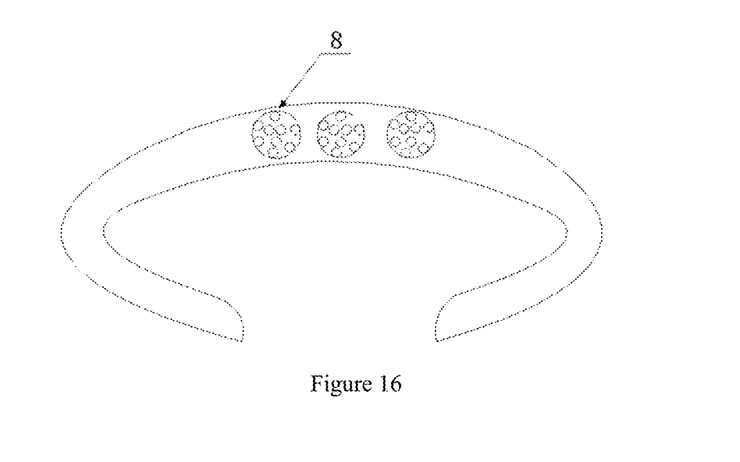
FIG. 16 is a schematic diagram showing a structure of a wearable dry electrode-based electroencephalographic signal collection headband.
Figure 17:
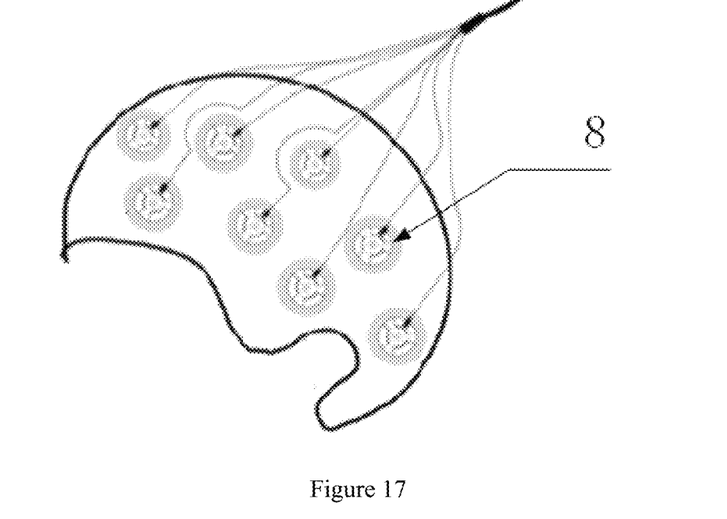
FIG. 17 is a schematic diagram showing a structure of a wearable dry electrode-based electroencephalographic signal collection cap.
Figure 18:
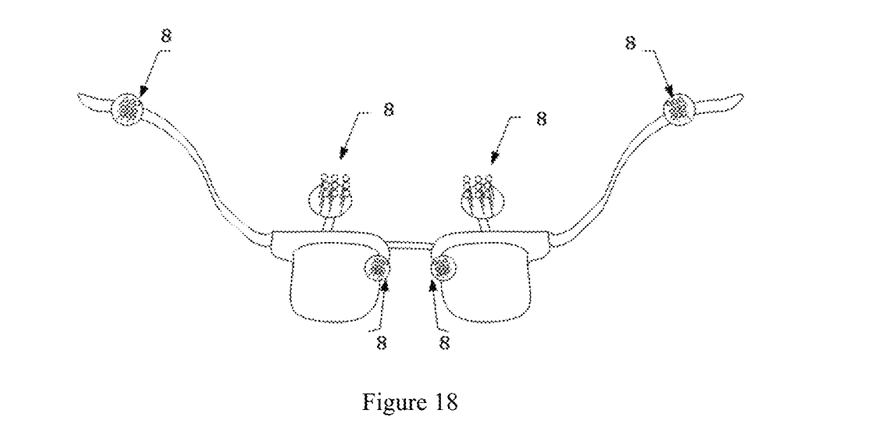
FIG. 18 is a schematic diagram showing a structure of a wearable dry electrode-based electroencephalographic signal collection eyeglasses.

The electroencephalographic device based on the elastic electroencephalographic dry electrode 8 may be a wearable dry electrode-based electroencephalographic signal collection headband, a wearable dry electrode-based electroencephalographic signal collection cap and a wearable dry electrode-based electroencephalographic signal collection eyeglasses, respectively shown in FIGS. 16 to 18. The above electroencephalographic devices, each including the elastic electroencephalographic dry electrode 8, are applicable to daily monitoring of the electroencephalographic signal or assisting a disabled person with brain control rehabilitation training, and to brain control entertainment activities. The embodiments of the present disclosure are applicable the above scenarios.

Specific Operations (1) A display screen displays an operable interface for a user, and an electroencephalographic signal is generated in response to the user watching an operation subject based on an operational intent.

(2) The electroencephalographic signal is collected by an electroencephalographic dry electrode and transmitted to the data processing module.

(3) The data processing module performs operations such as pre-processing, feature extraction, and classification and recognition on the electroencephalographic signal received to determine the operation subject that the user is currently watching and issues an operation command, where the data processing module may employ typical algorithms of feature processing and pattern recognition (such as TRCA, DCPM, CCA and SVM) to extract features and recognize patterns from the electroencephalographic signal.

Descriptions in the specification of the present disclosure, reference terms "an embodiment", "some embodiments", "an example", "a specific example" or "some examples" mean that a particular feature, structure, material, or characteristic described in connection with the embodiment or example is included in at least one embodiment or example of the present disclosure. In this specification, schematic expressions of the above reference terms are not necessarily referring to the same embodiment or example of the present disclosure. Furthermore, the particular features, structures, materials, or characteristics may be combined in any suitable manner in one or more embodiments or examples. In addition, different embodiments or examples and features in different embodiments or examples as described in this specification may be combined by those skilled in the art, without conflicting with each other.

In addition, terms such as "first" and "second" are used herein for purposes of description and are not intended to indicate or imply relative importance or impliedly indicate quantity of the technical feature referred to. Thus, the feature defined with "first" and "second" may indicate or imply that at least one of this features. In the description of the present disclosure, "a plurality of" means two or more than two this features, such as two, three and the like, unless specified otherwise.

All disclosed embodiments can be separately implemented or combined with other embodiments, and all are considered within the scope of the present disclosure.

Although embodiments of the present disclosure have been disclosed and described, those skilled in the art will understand that various changes, modifications, alternatives, and variations can be made to these embodiments without departing from the principles and purposes of the present disclosure. The scope of the present disclosure is defined by the claims and their equivalents.

What is claimed is:

1. An elastic electroencephalographic dry electrode, comprising an electrode base and a plurality of dry electrode units fixedly arranged at the electrode base,
wherein each dry electrode unit comprises an elastic support component and a plurality of electrode probe components, with one end of the elastic support component fixed to the electrode base and the other end of the elastic support component connected to the electrode probe components;
the electrode probe components collect an electroencephalographic signal by contacting with a scalp;
the electrode probe components are of a curved surface fitting to contact with the scalp;
the electrode probe components are of a cross-section in a circular or oval shape;
the electrode probe components are coated with a biocompatible material layer on its surface;
outside the biocompatible material layer, the electrode probe components are further coated with a hydrogel layer;
the elastic support component transmits the electroencephalographic signal;
the electrode base comprises an electrode substrate component, an electrode unit fixation component and a plurality of electrode unit shift limitation components,
wherein the electrode unit fixation component itself has an inclining angle and is fixedly arranged at the electrode substrate component, for fixing the dry electrode units to incline and spread outward;
the plurality of electrode unit shift limitation components, are fixed uniformly and symmetrically at an upper end of the electrode unit fixation component, for limiting a maximum shift of the dry electrode unit on the scalp,
wherein the electrode unit shift limitation component is of a height less than or equal to that of the shortest dry electrode unit; and
the electrode substrate component fixes and connects the dry electrode unit and transmits the electroencephalographic signal collected to a data processing module,
wherein the plurality of dry electrode units are arranged at the electrode substrate component in a layout of unipolar arrangement, bipolar arrangement, or multipolar arrangement,
wherein based on the layout of the unipolar arrangement, the plurality of dry electrode units are arranged at the electrode substrate component in an array occupying a trapezoid, square or triangle area; and
based on the layout of the bipolar arrangement or the multipolar arrangement, the plurality of dry electrode units are arranged at the electrode substrate component in an array of a circular ring or a triangular ring, forming a Laplacian electrode.

2. The elastic electroencephalographic dry electrode according to claim 1, wherein the elastic support component comprises an elastic conductive filament.

3. The elastic electroencephalographic dry electrode according to claim 2, wherein the elastic conductive filament is made of a nickel-titanium alloy.

4. The elastic electroencephalographic dry electrode according to claim 1, wherein the elastic support of a length of 3 to 30 mm and a diameter of 0.5 to 5 mm.

5. The elastic electroencephalographic dry electrode according to claim 1, wherein the elastic support component further comprises:

a conductive coating plated on a surface of the elastic conductive filament; or
an additional conductive filament arranged parallel to or embedded in the elastic conductive filament.

6. The elastic electroencephalographic dry electrode according to claim 5, wherein the conductive coating is made of copper or silver; and
the additional conductive filament is a silver filament, a copper filament, an aluminum filament, a nickel filament, a titanium filament or a nickel-plated carbon steel filament.

7. The elastic electroencephalographic dry electrode according to claim 1, wherein the electrode substrate component and the electrode probe components each are made of a conductive material.

8. The elastic electroencephalographic dry electrode according to claim 1, wherein the electrode probe components are made of a material with low impedance, wherein the material with low impedance is a copper ball of purple copper, a copper ball of brass, a nickel-titanium alloy, conductive silicone or conductive rubber.

9. The elastic electroencephalographic dry electrode according to claim 1, wherein the biocompatible material layer is made of silver/silver chloride or gold.

10. The elastic electroencephalographic dry electrode according to claim 1, wherein the electrode probe components are of a cross-section having a maximum distance between two points ranging from 1 to 7.5 mm.

11. The elastic electroencephalographic dry electrode according to claim 1, wherein the electrode substrate of a cross-section having a maximum distance between two points ranging from 5 to 50 mm.

12. The elastic electroencephalographic dry electrode according to claim 1, wherein the electrode substrate component is a Printed Circuit Board (PCB), wherein the PCB is in a circular, square or triangular shape.

13. The elastic electroencephalographic dry electrode according to claim 1, wherein the electrode unit fixation component is inclined at an angle and provided with built-in slots for fixing the dry electrode units at position.

14. The elastic electroencephalographic dry electrode according to claim 13, wherein the electrode unit fixation component is inclined at an angle of 15°, 20° or 25°.

15. The elastic electroencephalographic dry electrode according to claim 1, wherein the electrode unit shift limitation component is both elastic and flexible.

16. An electroencephalographic device, comprising:
an electroencephalographic dry electrode according to claim 1; and
a data processing module,
wherein the electroencephalographic dry electrode collects and transmits an electroencephalographic signal to the data processing module,
wherein the data processing module processes the electroencephalographic signal received and issues an operation command.

17. An application system, comprising:
an electroencephalographic device according to claim 16; and
a display screen,
wherein the display screen displays an operable interface for a user;
an electroencephalographic signal is generated in response to the user watching the operable interface.

* * * * *